US006668788B2

(12) United States Patent
Agama et al.

(10) Patent No.: US 6,668,788 B2
(45) Date of Patent: Dec. 30, 2003

(54) HOMOGENOUS CHARGE COMPRESSION IGNITION ENGINE HAVING A CYLINDER INCLUDING A HIGH COMPRESSION SPACE

(75) Inventors: Jorge R. Agama, Peoria, IL (US); Scott B. Fiveland, Peoria, IL (US); Ronald P. Maloney, Peoria, IL (US); James J. Faletti, Spring Valley, IL (US); John M. Clarke, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 47 days.

(21) Appl. No.: 10/029,417

(22) Filed: Dec. 20, 2001

(65) Prior Publication Data

US 2003/0116120 A1 Jun. 26, 2003

(51) Int. Cl.[7] ............................ F02B 19/04; F02B 19/06
(52) U.S. Cl. ..................... 123/254; 123/259; 123/275; 123/305
(58) Field of Search ......................... 123/254, 259, 123/275, 305

(56) References Cited

U.S. PATENT DOCUMENTS

| 4,768,481 A | * | 9/1988 | Wood .................... 123/254 |
| 4,995,348 A | | 2/1991 | Melchior |
| 5,144,928 A | | 9/1992 | Komurasaki |
| 5,832,880 A | | 11/1998 | Dickey |
| 5,875,743 A | | 3/1999 | Dickey |
| 5,934,245 A | | 8/1999 | Miller et al. |

| 2003/0041836 A1 | * | 3/2003 | Roberts, Jr. .............. 123/276 |

FOREIGN PATENT DOCUMENTS

| WO | WO 98/07973 | 2/1998 |
| WO | WO 98/10179 | 3/1998 |
| WO | WO 99/42718 | 8/1999 |

OTHER PUBLICATIONS

J. Willand, R. Gunther Nieberding, G. Vent, and C. Enderle, Daimlerchrysler AG; The Knocking Syndrome: Its Cure And Potential, 5 pgs, Automotive Engineering International (64–68), Dec. 1999, USA.

R. Stanglmaier, C. Roberts, Homogenous Charge Compression Ignition (HCCI): Benefits, Compromises, and Future Engine Applications, 8 pgs, Society of Automotive Engineers (1999–01–3682)(1–8), 1999, USA.

* cited by examiner

Primary Examiner—Erick Solis
(74) Attorney, Agent, or Firm—Liell & McNeil (57) ABSTRACT

The present invention relates generally to the field of homogeneous charge compression engines. In these engines, fuel is injected upstream or directly into the cylinder when the power piston is relatively close to its bottom dead center position. The fuel mixes with air in the cylinder as the power piston advances to create a relatively lean homogeneous mixture that preferably ignites when the power piston is relatively close to the top dead center position. However, if the ignition event occurs either earlier or later than desired, lowered performance, engine misfire, or even engine damage, can result. Thus, the present invention divides the homogeneous charge between a controlled volume higher compression space and a lower compression space to better control the start of ignition.

7 Claims, 6 Drawing Sheets

Fig_4a_

Fig_4b_

HOMOGENOUS CHARGE COMPRESSION IGNITION ENGINE HAVING A CYLINDER INCLUDING A HIGH COMPRESSION SPACE

GOVERNMENT LICENSE RIGHTS

The U.S. Government has a paid-up license in this invention and the right in limited circumstances to require the patent owner to license others on reasonable terms as provided for by the terms of DE-FC05-97OR22605, awarded by the Department of Energy. In other words, this invention was made with Government support under DE-FC05-97OR22605 awarded by the Department of Energy. The Government has certain rights in this invention.

TECHNICAL FIELD

This invention relates generally to homogeneous charge compression ignition engines, and more particularly to homogeneous charge compression ignition engines having cylinders with a high compression space and a low compression space.

BACKGROUND

Due in part to more stringent government emissions standards, engineers have long been searching for methods to reduce emissions created by diesel engines. One solution that has shown reasonable success in lowering NOx and soot emissions is the use of a Homogenous Charge Compression Ignition (HCCI) engine operating mode. In HCCI operation, fuel is injected into an engine cylinder when the power piston is at or near the bottom dead center position of its compression stroke. As the power piston advances toward its top dead center position, the fuel then mixes with air in the cylinder to form a relatively lean fuel/air mixture, which creates fewer emissions upon ignition.

While HCCI operation has shown some success at reducing diesel engine emissions, there is still room for improving engine utilizing this mode of operation.

For instance, while fuel is injected into the cylinder when the power piston is near the bottom dead center position, ignition of the fuel/air mixture should not occur until the power piston is at or near its top dead center position. When the start of ignition occurs too soon, the fuel and air mixture will burn during the compression stroke of the cylinder piston, resulting in possible engine damage and poor cycle efficiency. In addition, this could lead to high temperatures during the next engine cycle, which could result in another early start of ignition. Thus, control of ignition timing in response to engine operating conditions, such as cylinder temperature and fuel pressure, is critical.

One attempt to control ignition timing is illustrated in U.S. Pat. No. 5,832,880, which issued to Dickey on Nov. 10, 1998, and is entitled Apparatus And Method For Controlling Homogenous Charge Compression Ignition Combustion In Diesel Engines. In Dickey, a closed loop control strategy is disclosed which includes regulation of the timing by controlling an amount of water that is injected into a cylinder of a homogenous charge compression ignition engine to control the start of ignition. While this purported solution may have some viability, there is still room for improvement. For instance, for those engines that do not utilize water-spraying fuel injectors, a solution to controlling timing of ignition events is needed.

The present invention is directed to overcoming one or more of the problems as set forth above.

SUMMARY OF THE INVENTION

In one aspect of the present invention, a homogeneous charge compression ignition engine includes an engine housing defining at least one cylinder. A power piston having a raised portion is positioned to reciprocate in the cylinder between a bottom dead center position and a top dead center position. A fuel injector for the cylinder is operable to inject fuel into the cylinder when the power piston is closer to the bottom dead center position than to the top dead center position. The power piston and the engine housing define at least part of a high compression space and at least part of a low compression space when the power piston is in the top dead center position.

In another aspect of the present invention, a method of igniting a homogeneous charge in an engine includes the step of injecting fuel into a cylinder when a power piston is closer to a bottom dead center position than a top dead center position. A homogeneous charge is divided between a high compression space and a low compression space with a power piston. A portion of the homogeneous charge in the high compression space is ignited, at least in part by compressing the portion to a compression ignition point. A remaining portion of the homogeneous charge is ignited, at least in part by fluidly connecting the high compression space to the low compression space.

In yet another aspect of the present invention, a homogeneous charge compression ignition engine includes an engine housing defining at least one cylinder having a centerline. A power piston having a raised portion is positioned to reciprocate in the cylinder between a bottom dead center position and a top dead center position. A fuel injector for the cylinder is operable to inject fuel into the cylinder when the power piston is closer to the bottom dead center position than to the top dead center position. The power piston and the engine housing define at least part of a high compression space and at least part of a low compression space when the power piston is in the top dead center position, wherein the centerline intersects the high compression space.

DETAILED DESCRIPTION

Figure 1:
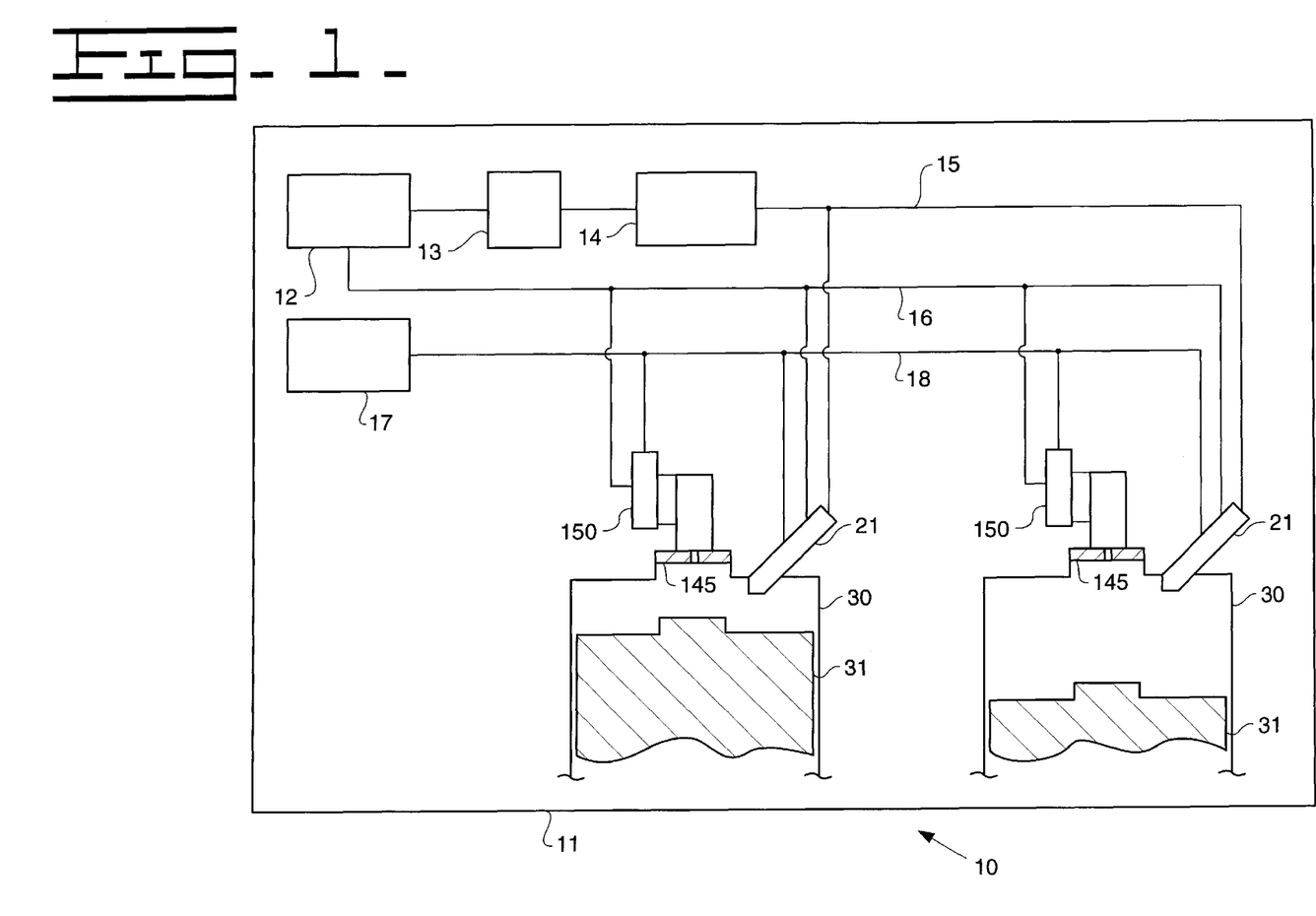
FIG. 1 is a schematic representation of an engine according to one aspect of the present invention.

Referring now to FIG. 1 there is illustrated an engine 10 according to the present invention. A low pressure reservoir 12 is provided in engine 10 and preferably includes an amount of low pressure engine lubricating oil. While low pressure reservoir 12 is preferably an oil pan that has an amount of engine lubricating oil, it should be appreciated that other fluid sources having an amount of available fluid, such as coolant, transmission fluid, or fuel, could instead be used. A high pressure pump 13 pumps oil from low pressure reservoir 12 and delivers the same to high pressure manifold 14. High pressure oil flowing out of high pressure manifold 14 is delivered via high pressure fluid supply line 15 to a hydraulic system provided in engine 10, and used oil is returned to low pressure reservoir 12 via low pressure return line 16 after it has performed work in the hydraulic system. An electronic control module 17 is provided by engine 10 and is in control communication with one or more engine components via an electronic communication line 18. Electronic control module 17 preferably controls multiple aspects of engine 10 operation, such as fuel injection timing and ignition timing. Engine 10 also provides an engine housing 11 that defines a plurality of engine cylinders 30.

Each cylinder 30 defined by engine housing 11 has a movable power piston 31. While engine 10 has been illustrated including only two cylinders 30, it should be appreciated that it could instead provide any suitable number of cylinders. Each power piston 31 is movable between a bottom dead center position and a top dead center position. The upward and downward strokes of each power piston 31 could correspond to the traditional strokes of either a two cycle or four cycle engine. Regardless of whether engine 10 is a two stroke or four stroke engine, a fuel injector 21 will preferably inject fuel into cylinder 30 when power piston 31 is closer to the bottom dead center position than the top dead center position for its compression stroke. Thus, if engine 10 is a two stroke engine, fuel injector 21 will inject fuel into cylinder 30 each time piston 31 is at or near its bottom dead center position, while fuel injector 21 will injector fuel when piston 31 is at or near the bottom dead center position during alternate strokes if engine 10 is a four stroke engine. Fuel that has been injected into cylinder 30 can then mix with air in cylinder 30 to form a relatively lean homogeneous fuel/air mixture. When power piston 31 is at or near its top dead center position, this fuel/air mixture will ignite, causing piston 31 to move toward the bottom dead center position for its power stroke.

Figure 2:
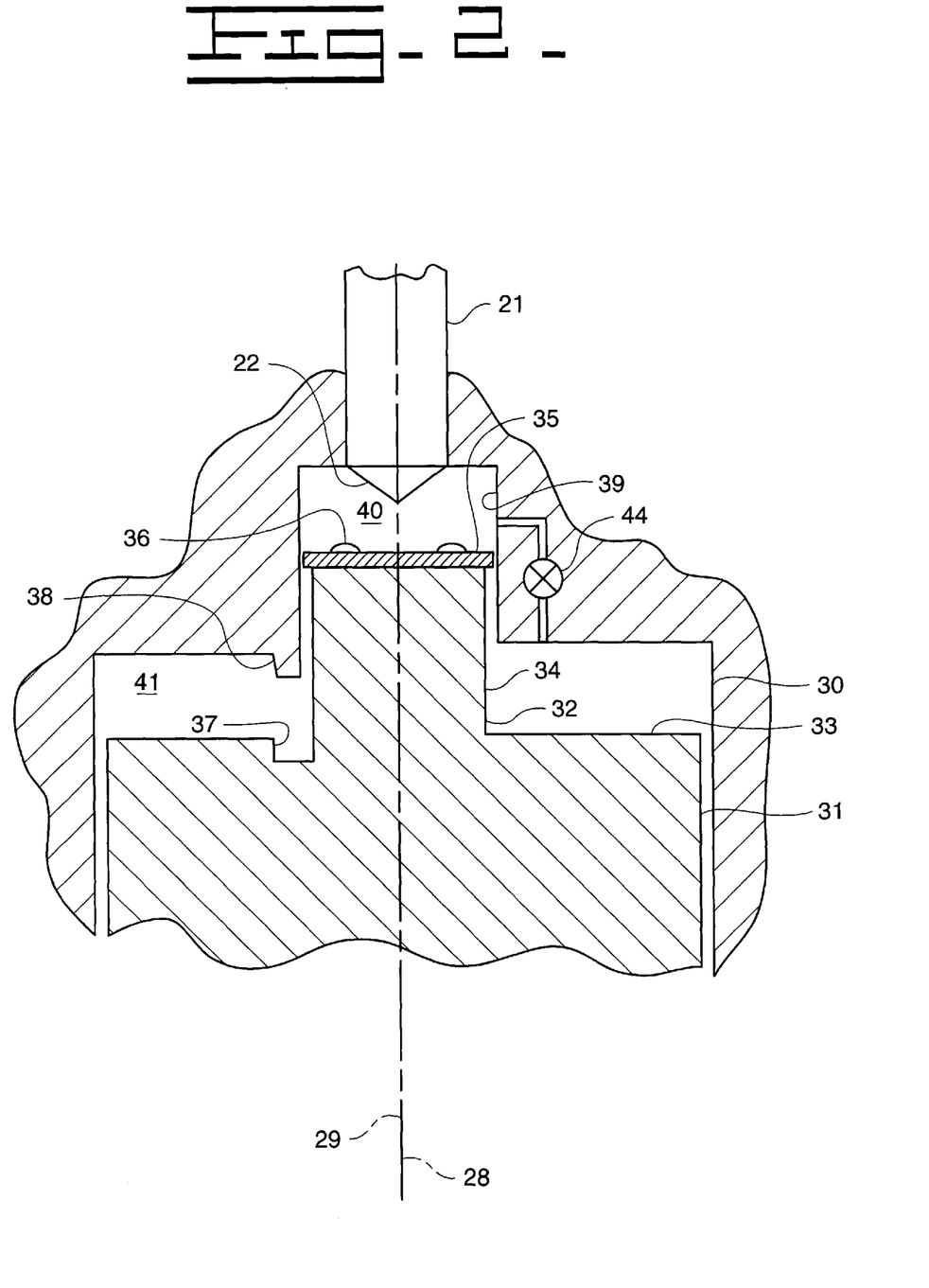
FIG. 2 is a partial sectioned side diagrammatic view of a cylinder and power piston according to one embodiment of the present invention.

Referring in addition to FIG. 2, there is shown a sectioned side diagrammatic view of one cylinder 30 and its respective power piston 31 according to one embodiment of the present invention. A top surface 33 of power piston 31 preferably provides a stepped top that has a raised portion 34. Raised portion 34 preferably includes a cylindrical wall 32 that is centered on a centerline 29 of power piston 31, such that centerline 29 intersects raised portion 34. A seal disk 35 is attached to raised portion 34, preferably by one or more bolts 36. Seal disk 35 is preferably attached in a loose manner, such that it can move slightly with respect to raised portion 34. Alternatively, or in addition, sealing could be accomplished with one or more piston rings. As power piston 31 approaches its top dead center position, seal disk 35 comes into contact with a number of seal disk guides 38. While only one seal disk guide 38 has been illustrated, cylinder 30 preferably includes at least three seal disk guides 38 that are equally spaced about a centerline 28 of cylinder 30. When power piston 31 approaches its top dead center position seal disk guides 38 ensure smooth engagement of seal disk 35 into recessed cavity bore 39. Seal disk guides 38 are received in clearance bores 37. The use of one or more seal disk guides 38, while not necessary for the present invention, is preferable because as power piston 31 is approaching its top dead center position, it may not be perfectly centered within cylinder 30. However, as seal disk 35 comes in contact with seal disk guides 38, seal disk 35, which is slideably mounted on raised portion 34, can be appropriately aligned within cylinder 30 to prevent seal disk 35 from colliding with the cylinder head. It should be appreciated that clearances are sufficient to prevent raised portion 34 from contacting recessed cavity bore 39.

Fuel injector 21 is preferably attached to cylinder 30 such that an injector tip is positioned in a recessed cavity 39 defined by cylinder 30. Recessed cavity 39 is sized and positioned to receive raised portion 34 of power piston 31. It should be appreciated that recessed cavity 39 is also sufficiently sized to prevent raised portion 34 from coming into contact with injector tip 22 when power piston 31 is in its top dead center position. When power piston 31 approaches its top dead center position, the volume of recessed cavity 39 is preferably substantially less than the volume of the remainder of cylinder 30 above power piston 31. In addition, the portion of recessed cavity 39 between raised portion 34 and the cylinder head is preferably fluidly isolated from the remainder of cylinder 30. It should be appreciated that if the volume in recessed cavity 39 above raised portion 34 is substantially less than the volume in the remainder of the cylinder above power piston 31, temperature and pressure within recessed cavity 39 will rise at an accelerated rate within recessed cavity 39 as power piston 31 approaches its top dead center position. Thus, these features of the present invention allow the homogeneous charge in cylinder 30 to be divided between a high compression space 40 in recessed cavity 39 above raised portion 34 and a low compression space 41 in the remainder of cylinder 30 above power piston 31.

Recall that, for homogeneous charge compression ignition engines, fuel is injected into cylinder 30 when power piston 31 is at or near its bottom dead center position. However, ignition is desired when power piston 31 is at or near its top dead center position. Thus, the geometry of cylinder 30 should be such that the temperature and pressure of the fuel/air mixture within cylinder 30 will reach ignition levels when power piston 31 is at or near top dead center, while not accelerating temperature and pressure within cylinder 30 to these levels too soon. The present invention utilizes division of the homogeneous charge between high compression space 40 and low compression space 41 to better control the timing of the ignition event. It should be appreciated that the homogeneous charge in cylinder 30 is not divided between high compression space 40 and low compression space 41 until raised portion 34 enters recessed cavity 39. Therefore, the geometry created by the present invention will noticeably effect temperature and pressure levels within cylinder 30 over only a small portion of the movement of power piston 31. In other words, the present invention will not sufficiently effect temperature and pressure levels within cylinder 30 to cause the fuel/air mixture in cylinder 30 to ignite before power piston 31 nears its top dead center position. However, recessed cavity 39 should be sized such that the homogeneous charge trapped in high compression space 40 will be brought to ignition temperature and pressure as power piston 31 nears or reaches its top dead center position.

It should be appreciated that for the embodiment of the present invention illustrated in FIG. 2, the size of recessed cavity 39, and therefore high compression space 40, that will ensure ignition temperature and pressure will be reached will be dependent upon factors such as injection pressure, intake temperature and the overall volume of cylinder 30. For example, for an engine 10 having a known range of intake temperatures, the size of recessed cavity 39 needed to create an ignition event that occurs at the desired time can be determined. However, if the actual intake temperature varies dramatically from what is expected, this could alter the effectiveness of the use of high compression space 40 to control injection timing. For instance, if the intake temperature is significantly lower than expected, ignition temperature might not be reached, even within high compression space 40. Likewise, if the intake temperature is significantly higher than expected, ignition temperature could be reached before raised portion 34 enters recessed cavity 39. Thus, it should be appreciated that the size, or volume, of recessed cavity 39 with respect to the remainder of cylinder 30 is dependent upon a number of factors.

Returning now to FIG. 2, it should be appreciated, however, that due to the machining tolerances of such components as raised portion 34, seal disk 35 and recessed cavity 39, as well as because power piston 31 is in continuous motion, complete fluid isolation between high compression space 40 and low compression space 41 might not be attainable. Therefore, it should be appreciated that high compression space 40 and low compression space 41 may only be substantially fluidly isolated. In addition, while the present invention has been described for a high compression space 40 and low compression space 41 that are fluidly isolated, or substantially fluidly isolated, when raised portion 34 enters recessed cavity 39, this might not always be preferable. It should be appreciated that if high compression space 40 and low compression space 41 are fluidly isolated, a first ignition event will occur within recessed cavity 39 before ignition levels are reached in low compression space 41. However, the main charge will not be ignited until power piston 31 retracts sufficiently to fluidly reconnect low compression space 41 with high compression space 40. In other words, the main ignition event could occur once power piston 31 is retracting toward its bottom dead center position, rather than when power piston 31 is at its top dead center position.

Alternatively, it could be preferable for raised portion 34 and recessed cavity 39 to be sized and arranged such that fluid communication exists between high compression space 40 and low compression space 41 in the form of a controlled spill around raised portion 34. In this alternative, high compression space 40 would be sufficiently fluidly isolated from low compression space 41 to allow ignition temperature to be reached when power piston 31 is at or near its top dead center position. However, sufficient leakage around raised portion 34 into low compression space 41 could allow an accelerated rate of increase in the temperature of the fuel/air mixture in the remainder of cylinder 30. Therefore, it would be possible to raise the temperature within low compression space 41 to produce either a single ignition event or multiple ignition events, one in each of high compression space 40 and low compression space 41, that occur very close in time. This alternative might be further enhanced by having the ability to control a flow area between spaces 40 and 41, such as by usage of a variable flow area valve 44, as shown in FIG. 2.

Figure 3:
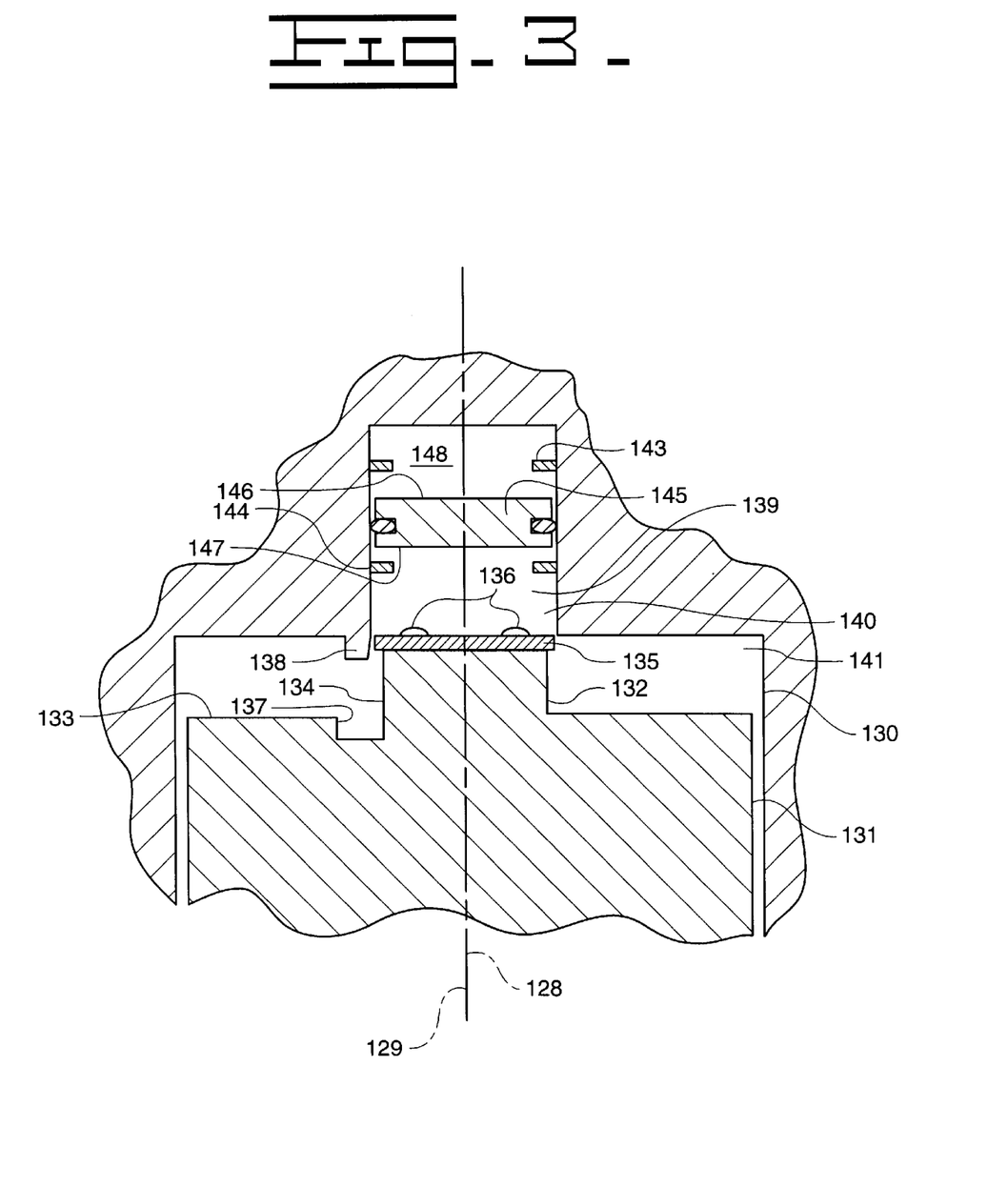
FIG. 3 is a partial sectioned side diagrammatic view of a cylinder and power piston of the engine of FIG. 1 according to the preferred embodiment of the present invention.

Returning to FIG. 2, it should be appreciated that while the division of the homogeneous charge between high compression space 40 and low compression space 41 can increase control over the start of ignition, even greater control over the ignition event could be achieved by modifying the cylinder illustrated in FIG. 2 to include a volume control mechanism that defines a portion of high compression space 40. Referring now to FIG. 3, a cylinder 130 and power piston 131 are illustrated according to the preferred embodiment of the present invention. While cylinder 130 and power piston 131 share a number of features with cylinder 30 and power piston 31, the preferred embodiment also includes a volume control mechanism 149 (FIG. 5) that can vary the volume of a high compression space 140.

As with the previous embodiment, cylinder 130 defines a recessed cavity 139 that is sized and positioned to receive a raised portion 134 included on a top surface 133 of power piston 131. Raised portion 134 preferably includes a cylindrical wall 132 that is centered on a centerline 129 of power piston 131, such that centerline 129 intersects raised portion 134. A seal disk 135 is preferably loosely attached to raised portion 134, such as by one or more bolts 136. As power piston 131 approaches its top dead center position, seal disk 135 can contact a number of seal disk guides 138. As with the previous embodiment, while only one seal disk guide 138 has been illustrated, cylinder 130 preferably includes at least three seal disk guides 138 that are equally spaced about a centerline 128 of cylinder 130. When power piston 131 is at its top dead center position, each seal disk guide 138 can be received in a clearance bore 137, defined by power piston 131. When power piston 131 approaches its top dead center position, the homogeneous charge in cylinder 130 will be divided between high compression space 140 and a low compression space 141 that is formed in the remainder of cylinder 130 above power piston 131. Once again, it should be appreciated that if the volume of high compression space 140 is substantially less than the volume of low compression space 141, temperature will rise at an accelerated rate within high compression space 140 as power piston 131 approaches its top dead center position. However, in this embodiment, high compression space 140 has a variable volume that is controlled by volume control mechanism 149 (FIG. 5) that provides a control piston 145 that is positioned in recessed cavity 139.

Figure 4A:
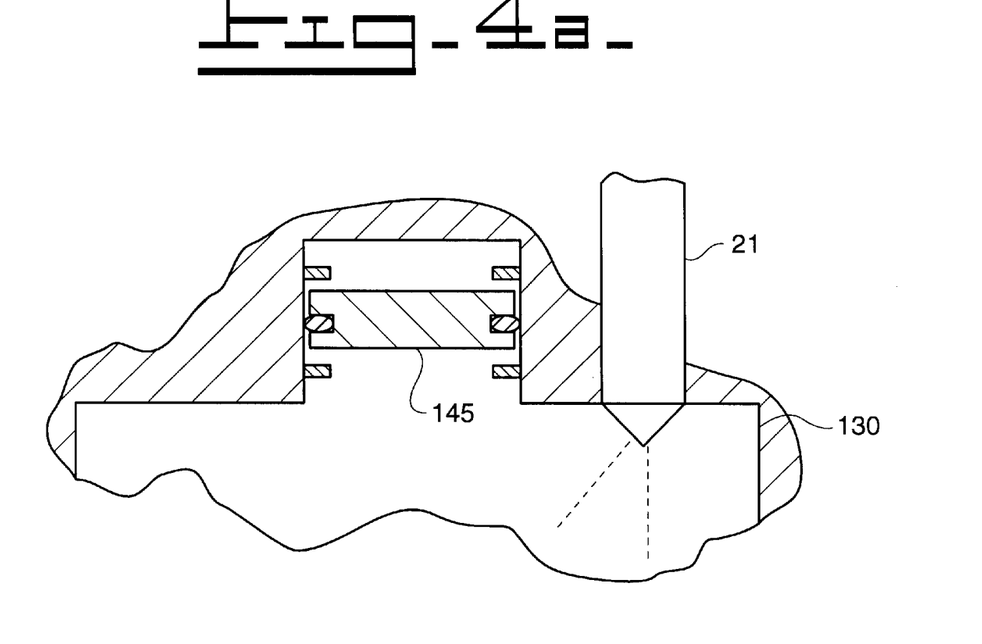
FIG. 4a is a partial sectioned side diagrammatic view of the cylinder of FIG. 3 according to one aspect of the present invention.
Figure 4B:
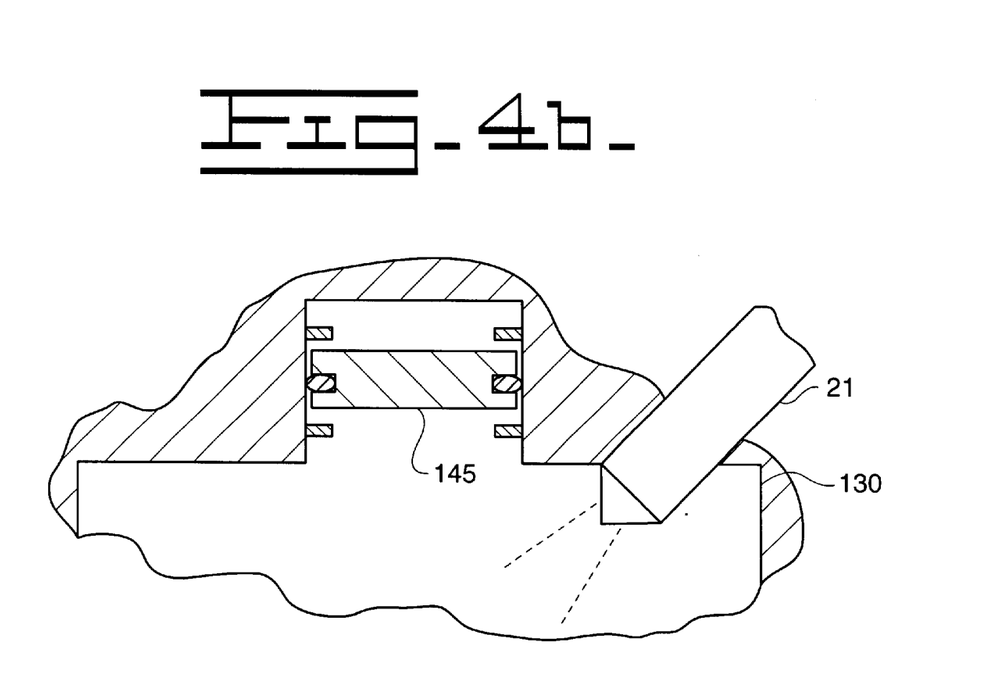
FIG. 4b is a partial sectioned side diagrammatic view of the cylinder of FIG. 3 including an alternatively configured fuel injector.

It should be appreciated that because control piston 145 is positioned in recessed cavity 139, which is preferably in the center of cylinder 130, fuel injector 21 will need to be repositioned with respect to cylinder 130 to prevent fuel injection above control piston 145. Thus, fuel injector 21 is preferably offset from cylinder centerline 128, as illustrated in FIG. 4a. However, it is known that when fuel spray hits the wall of a cylinder, such as cylinder 130, smoke or other emissions could be produced. Thus, fuel injector 21 should be oriented to reduce the likelihood of injection fuel onto the walls of cylinder 130. For instance, as illustrated in FIG. 4a, fuel injector 21 could include nozzle outlets that are positioned at an angle with respect to the centerline of the fuel injector. Fuel spray from one or more injector nozzle outlets could be directed substantially downward, while spray from one or more other injector nozzle outlets could be at a greater angle. Alternatively, instead of positioning fuel injector 21 parallel to cylinder centerline 128, fuel injector 21 could instead be placed at an angle with respect to cylinder centerline 128, as illustrated in FIG. 4b. This might be desirable because fuel injectors for use with homogeneous charge compression ignition engines typically inject fuel an a very small angle with respect to the fuel injector centerline. It should also be appreciated that the location and orientation of fuel injector 21 will be limited by such factors as number and size of other devices attached to cylinder 130, such as intake and exhaust valves, as well as the size and placement of those components of volume control mechanism 149 that might be positioned external to cylinder 130.

Returning to FIG. 3, control piston 145 is movable between an upward position, defined by an upper stop 143, and a downward position, defined by a lower stop 144. While the maximum upward position and maximum downward position of control piston 145 are limited by upper stop 143 and lower stop 144, respectively, control piston 145 is preferably capable of stopping at an infinite number of positions between these extremes. Control piston 145 includes an ignition surface 147 that is exposed to fluid pressure within cylinder 130 and a control surface 146 that is positioned in opposition to ignition surface 147 and is exposed to fluid pressure in a control cavity 148. When piston 131 approaches its top dead center position, recessed cavity 139 becomes sufficiently blocked from the remainder of cylinder 130 by seal disk 135 and raised portion 134 to allow temperature and pressure within recessed cavity 139 to increase to ignition levels.

When power piston 131 approaches its top dead center position, the portion of recessed cavity 139 between control piston 145 and power piston 131 becomes substantially fluidly isolated from the remainder of cylinder 130 to allow pressure within recessed cavity 139 to raise to ignition levels. Thus, the homogeneous charge in cylinder 130 will be divided between a high compression space 140 that is formed in recessed cavity 139 between power piston 131 and control piston 145 and a low compression space 141 that is formed in the remainder of cylinder 130 above power piston 131. Once again, if the volume of high compression space 140 is substantially less than the volume of low compression space 141, temperature will rise at an accelerated rate within high compression space 140 as power piston 131 approaches its top dead center position. Because high compression space 140 will experience a greater rise in temperature as power piston 131 approaches its top dead center position than low compression space 141, ignition of the portion of the homogeneous charge in high compression space 140 will occur first, while low compression space 141 may not even reach ignition levels. Thus, by controlling the compression temperature within high compression space 140, timing of the ignition event can be controlled. The present invention controls the temperature, or the rate of temperature increase, within high compression space 140, by controlling the volume within the same.

By adjusting the location of control piston 145 within recessed cavity 139, the minimum volume of high compression space 140 can be changed. Thus, depending upon the desired start of ignition, high compression space 140 can be made relatively small, such as when control piston 145 is at or near its downward position, or it can be relatively large, such as when control piston 145 is at or near its upward position. Electronic control module 17 preferably determines if control piston 145 should be moved based upon an evaluation of one or more cylinder conditions, such as a cylinder pressure trace. However, regardless of the size of high compression space 140, raised portion 134 of power piston 131 is preferably capable of extending far enough into recessed cavity 139 that high compression space 140 is sufficiently fluidly isolated from low compression space 141 when power piston 131 is at its top dead center position that the two spaces are raised to relatively higher and lower pressures, respectively, when power piston 31 approaches top dead center. When power piston 131 begins to retract toward its bottom dead center position, low compression space 141 can once again be fluidly connected to high compression space 140, such that the relatively lean fuel/air mixture within low compression space 141 can ignite from the hot gases in high compression space 140.

Figure 5:
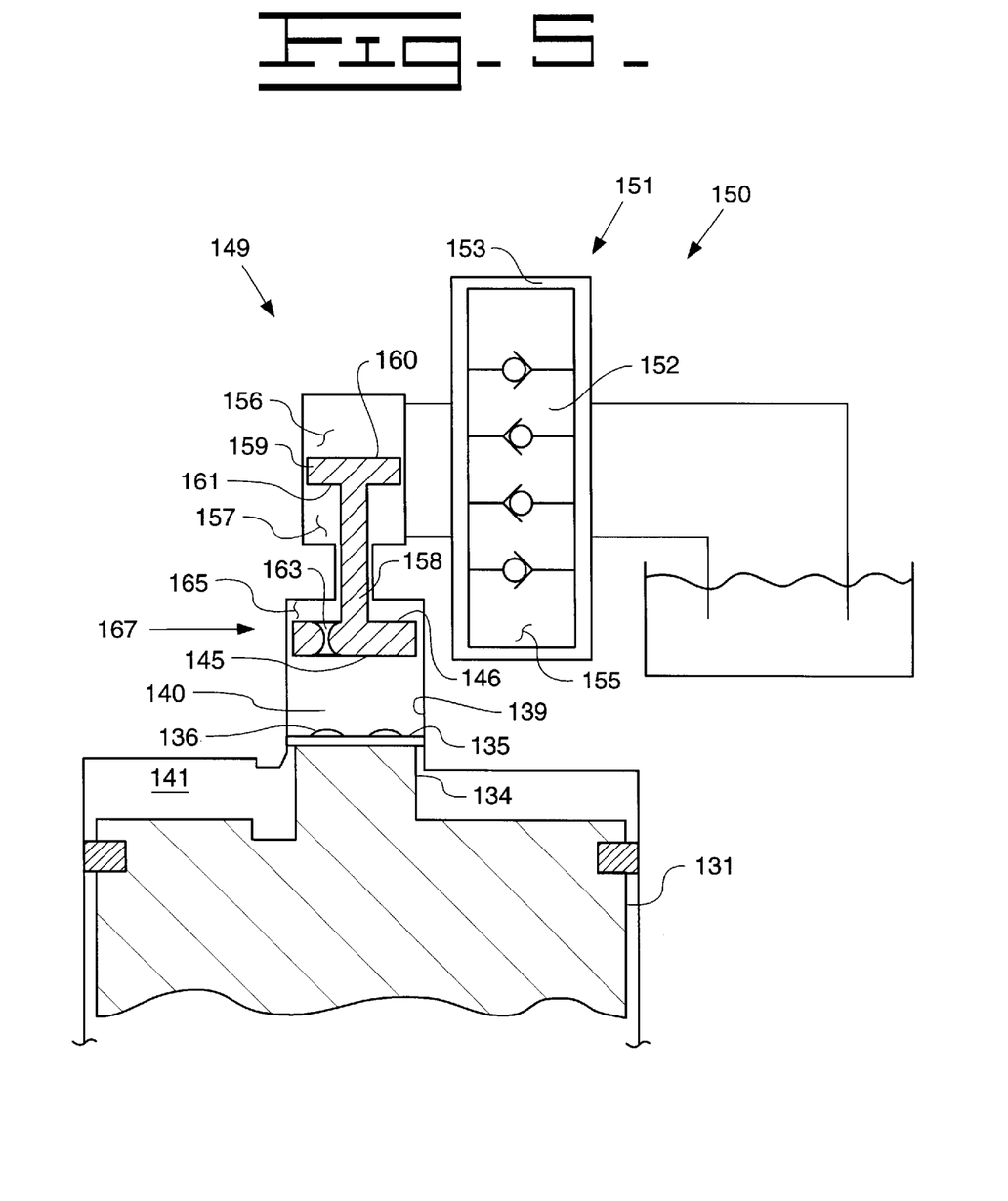
FIG. 5 is a schematic representation of the control piston and controller for the cylinder of FIG. 3.

It should be appreciated that several methods for controlling the movement of control piston 145 could be employed. Referring now in addition to FIG. 5, a compression ratio controller 150 has been illustrated to control the movement of control piston 145 between its upward and downward positions. A movable control valve member 158 is preferably provided by compression ratio controller 150. A control valve 151 is also preferably provided to control the movement of control valve member 158 between three positions. With control valve slider 152 in the no-flow position, the hydraulic cavities 156 and 157 are sealed and prevent movement of member 158. Control valve member 158 preferably includes a pneumatic portion 167 that provides a first pneumatic surface 146, exposed to pressure in a first cavity 165, and a second pneumatic surface 147, exposed to pressure in high pressure space 140. A match clearance preferably exists between pneumatic portion 167 and the control valve housing. Control piston 145, which is attached to member 158 includes a restricted orifice 163 that can allow limited gas flow between pneumatic cavity 165 and high compression space 40. Orifice 163 is preferably sufficiently restricted such that high compression space 140 behaves substantially like a closed volume when piston 131 approaches top dead center. Orifice 163 is sized so that pressure changes on surface 147, caused by engine operation, are averaged to a more constant pressure on surface 146. The result is an alternating force on control element 158. This force is prevented from moving control element 158 by the hydraulic portion unless the control valve 151 allows fluid to one side or the other. The check valves in the control valve can permit flows such that the element 148 increases or decreases the volume 140.

Returning to FIG. 5, control valve member 158 also preferably includes a hydraulic portion 159 that provides a first hydraulic surface 160, exposed to fluid pressure in a first hydraulic cavity 156, and a second hydraulic surface 161, exposed to fluid pressure in a second hydraulic cavity 157. Control valve 151 preferably provides a slide valve member 152 that is moved between three positions by a first actuator 153 and a second actuator 155. When slide valve member 152 is in its first position, such as when first actuator 153 is activated, first cavity 156 is fluidly connected to drain. When slide valve member 152 is in this position, second cavity 157 is open to receive fluid from the drain. When slide valve member 158 is in its second position, there is no flow in or out of cavities 156 and 157 so that the position of member 158 is locked. When slide valve member 152 is in its third position, such as when second actuator 155 is energized, first cavity 156 is open to receive fluid from the drain. When slide valve member 152 is in this position, second cavity 157 is open to drain. Thus control valve 151 is preferably operable to exploit pnuematic forces on piston to reposition member 158 and hence vary the volume of high compression space 140.

As previously indicated, movement of control valve member 158 controls the movement and locking of control piston 145. To allow control piston 145 to move toward its upward position for a subsequent ignition event, control valve member 158 should be in its first position. Slide valve member 152 is moved from its first position to its third position by first actuator 153, during the compression stroke. To allow control piston 145 to move toward its downward position for a subsequent ignition event, control valve member 158 should be in its third position. Thus, the volume of space 140 can be adjusted by activating actuators 153 and 155 with appropriate timing to utilize gas forces on piston 145 to adjust the position of the same.

When compression ratio controller 150 is configured as illustrated in FIG. 5, a match clearance preferably exists between control valve member 158 and the control valve housing to prevent fluid from hydraulic cavity 157 from flowing into control cavity 165. This is preferable because, without adequate sealing around control valve member 158, hydraulic fluid that has migrated into control cavity 165 could flow into cylinder 130 via space 140 and alter the combustion properties of the combustion event. It should be appreciated that the presence of hydraulic fluid in cylinder 130 (spaces 140 and 141) could lead to increased emissions and other ignition/combustion related problems. Due in part to these sealing and leakage concerns, it should be appreciated that other configurations of compression ratio controller 150 might be desirable. For instance, while control valve member 158 has been illustrated including both a hydraulic portion 159 and a pneumatic portion 167, it could instead include only pneumatic portion 167. Control cavity 165 could be alternately opened and closed to a high pressure pneumatic source to facilitate movement of control valve member 158.

Figure 6:
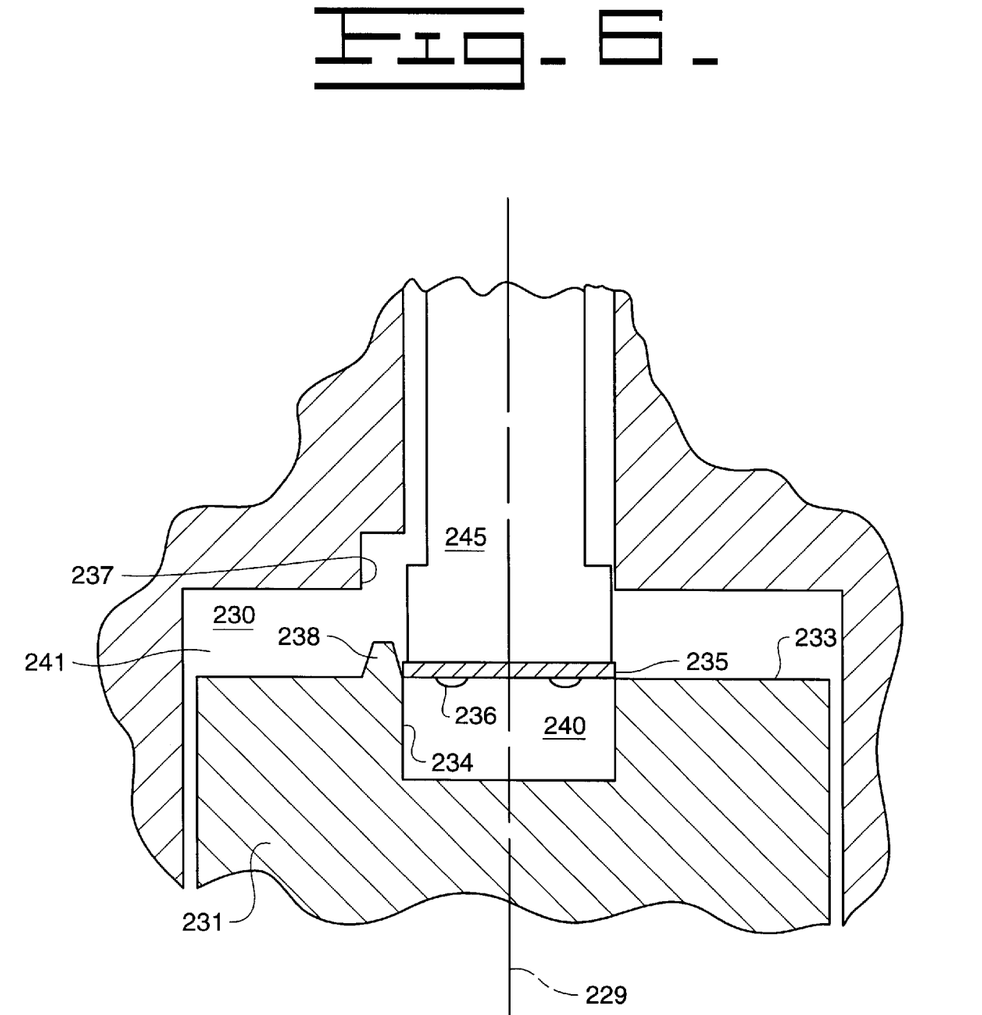
FIG. 6 is a partial sectioned side diagrammatic view of a cylinder and power piston according to another embodiment of the present invention.

Referring now to FIG. 6, there is shown a cylinder 230 and a power piston 231 according to yet another embodiment of the present invention. Power piston 231 includes a top surface 233 that defines a lowered portion 234. Lowered portion 234 is sized and positioned to receive a control piston 245 that is movable within cylinder 230. Preferably power piston 231 has a centerline 229 that intersects lowered portion 234. Control piston 245 is preferably movable between a downward position, as shown, and an upward position. It should be appreciated that control piston 245 could be controlled in its movement by a control valve member having a hydraulic portion and a pneumatic portion, such as that disclosed for the previous embodiment. However, it should be further appreciated that any suitable means for controlling the movement of control piston 245 could instead be utilized. For instance, control piston 245 could be controlled by a pneumatic control valve member that includes a surface exposed to a high pressure source that is alternatively opened and closed, such as that previously disclosed.

As indicated, control piston 245 is sized and positioned to be received in lowered portion 234 of power piston 231. A seal disk 235 is preferably attached to control piston 245 in any suitable manner, such as by fasteners 236. As with the previous embodiments of the present invention, seal disk 235 will preferably engage one or more seal disk guides 238 included on power piston 231 such that power piston 231 and seal disk 235 will be aligned with respect to one another as power piston 231 approaches its top dead center position. If control piston 245 is in its upward position, and if power piston 231 was otherwise allowed to approach the cylinder head, the one or more seal disk guides 238 could be received by corresponding clearance bores 237. Once engaged by power piston 231, control piston 245 helps to divide cylinder 230 into a high compression space 240, defined by lowered portion 234 and control piston 245, and a low compression space 241, defined by top surface 233 of power piston 231, cylinder 230 and control piston 245. Because control piston 245 is preferably movable to a range of positions between its downward and upward positions, the volume of high compression space 240 when power piston 231 is at top dead center can be adjusted as desired. Thus, by adjusting the distance that control piston 245 extends within lowered portion 234 when power piston 231 is at or near its top dead center position, the size of high compression space 240 can be changed.

Therefore, as with the preferred embodiment, depending upon the desired start of ignition, the high compression space can be made relatively small, such as when control piston 245 is at or near its downward position, or it can be relatively large, such as when control piston 245 is at or near its upward position. Once again, regardless of the desired size of high compression space 240, control piston 245 is preferably capable of extending far enough into lowered portion 234 that high compression space 240 is sufficiently fluidly isolated from low compression space 241 when power piston 231 is at its top dead center position to allow pressure within high compression space 240 to raise to ignition levels. Ignition of the remaining charge in low compression space 241 can be accomplished via leakage of hot gases around seal disk 235 or by more substantial fluid communication when raised portion 234 moves out of recessed cavity 239 as power piston 231 retracts.

Industrial Applicability

Referring now to FIGS. 1–2, just prior to the its compression stroke, power piston 31 is retracting toward its bottom dead center position. If engine 10 is a four stroke engine, this retraction corresponds to the intake stroke of power piston 31. However, if engine 10 is a two stroke engine, power piston 31 is undergoing its power stroke. Once power piston 31 reaches its bottom dead center position and begins to advance, fuel injector 21 injects an amount of fuel into cylinder 30. As power piston 31 advances, the fuel mixes with air within cylinder 30 to produce a relatively lean fuel/air mixture. As power piston 31 continues to advance, seal disk 35 comes into contact with the one or more seal disk guides 38. The interaction of seal disk 35 with seal disk guides 38 moves seal disk 35 into alignment with recessed cavity 39, if necessary. Once raised portion 34 has entered recessed cavity 39, the relatively lean fuel/air mixture within cylinder 30 is divided between high compression space 40 and low compression space 41.

Because high compression space 40 has a substantially smaller volume than low compression space 41, and because these fluid spaces are fluidly isolated, temperatures and pressure within high compression space 40 will rise much faster in high compression space 40 than in low compression space 41. Once ignition levels are reached within high compression space 40, the fuel/air mixture within recessed cavity 39 will ignite. Preferably, recessed cavity 39 has been sized such that this ignition event occurs when power piston 31 is at or near its top dead center position. Recall that ignition levels may not be reached in low compression space 41 as power piston 31 advances toward its top dead center position. However, as power piston 31 retracts toward its bottom dead center position and raised portion 34 retracts from recessed cavity 39, the fuel/air mixture in the remainder of cylinder 30 will be ignited as low compression space 41 is again fluidly connected to high compression space 40, and exposed to hot gasses within the same. Thus, the main charge within cylinder 30 will be ignited as power piston 31 is retracting toward its bottom dead center position.

Referring now to FIGS. 1 and 3–5, just prior to its compression stroke, power piston 131 is retracting toward its bottom dead center position. As power piston 131 begins to retract toward its bottom dead center position, electronic control module 17 determines whether the size of high compression space 140 should be increased, corresponding to the upward movement of control piston 145, decreased, corresponding to the downward movement of control piston 145, or that it should remain the same for the subsequent ignition event. If it is determined that high compression space 140 should be either increased or decreased in volume, electronic control module 17 signals first actuator 153 and second actuator 155 to move slide valve member 152 to the appropriate position.

If it is determined that high compression space 140 should be increased in volume, first actuator 153 is energized and slide valve member 152 is moved to its first position. First hydraulic cavity 156 is now open to drain to reservoir 12, and second hydraulic cavity 157 is now open to draw from reservoir 12. When higher pressure acts on first hydraulic surface 145 of pneumatic portion 167, control valve member 158 is moved to increase the volume of high pressure space 140. Control valve member 152 is maintained in a given position by not activating actuators 153 and 155 with member 152 in the second (no-flow) position. When power piston 131 is at its bottom dead center position, or when it has just begun to advance toward its top dead center position, fuel injector 21 injects an amount of fuel into cylinder 130. As power piston 131 advances, the fuel mixes with air in cylinder 130 to form a relatively lean fuel/air mixture.

When power piston 131 approaches its top dead center position, seal disk 135 contacts the one or more seal disk guides 138 and is centered within cylinder 130 relative to recessed cavity 139. In addition, because raised portion 134, and seal disk 135, are acting to fluidly isolate high compression space 140 from low compression space 141, high compression space 140 is now a substantially trapped volume. As power piston 131 continues to advance, the temperature and pressure within high compression space 140 are raised to ignition levels. When pressure within high compression space 140 is sufficient, the amount of relatively lean fuel/air mixture trapped within high compression space 140 ignites, preferably when power piston 131 is at or near its top dead center position. Power piston 131 begins to retract and raised portion 134 moves out of recessed cavity 139. Once power piston 131 has retracted sufficiently, high compression space 140 is fully opened to low compression space 141, and the fuel/air mixture within low compression space 141 is ignited via contact with the hot gases from high compression space 140. Power piston 131 is now driven downward toward is bottom dead center position by the full charge within the full cylinder 130.

Referring now to FIGS. 1 and 6, operation for this alternate embodiment of the present invention will be described. Electronic control module 17 determines if the subsequent injection event should be advanced in timing, corresponding to control piston 245 being moved toward its downward position, or retarded in timing, corresponding to control piston 245 being moved toward its upward position. Control piston 245 is then moved the desired distance in the appropriate manner. Recall that control piston 245 can be moved in a manner similar to control piston 145, such as with a control valve member that includes a hydraulic portion and a pneumatic portion, or in another suitable manner. As power piston 231 nears its top dead center position it contacts seal disk 235, which aids in the alignment of control piston 245 and power piston 231. As control piston 245 is received within lowered portion 234, high compression space 240 is created and sufficiently fluidly isolated from low compression space 241. Once the relatively lean fuel/air mixture within high compression space 240 is sufficiently compressed, it ignites, driving power piston 231 toward its bottom dead center position. As power piston 231 retracts, high compression space 240 is once again fully fluidly connected to low compression space 241 and the fuel within low compression space 241 can be ignited by the charge from high compression space 240.

It should be appreciated that various modifications could be made to the disclosed embodiments of the present invention without departing from the scope of the present invention. For instance, while the high compression space has been illustrated centered about the centerlines of the cylinder and the power piston, this could be modified. For instance, the high compression space could instead be defined to one side of the centerlines. However, it should be appreciated that the high pressure created by ignition on one side of the power piston, rather than in the center, could undesirably effect the downward movement of the power piston. In addition, while the high compression space has been described as being substantially smaller in volume than the low compression space, this too could be modified. It should be appreciated, however, that as the volume of the high compression space approaches that of the low compression space, control over the temperature within the high compression space to ensure desired ignition timing would become more difficult.

Thus, those skilled in the art will appreciate that other aspects, objects and advantages of this invention can be obtained from a study of the drawings, the disclosure and the appended claims.

What is claimed is:

1. A homogeneous charge compression ignition engine comprising:

an engine housing defining at least one cylinder;

a power piston having a raised portion and a lowered portion and being positioned to reciprocate in said cylinder between a bottom dead center position and a top dead center position;

a fuel injector in fluid communication with said cylinder and being operable to inject fuel into said cylinder when said power piston is closer to said bottom dead center position than to said top dead center position;

said power piston and said engine housing defining at least part of a high compression space and at least part of a low compression space when said power piston is at said top dead center position; and a volume control mechanism that includes a movable control piston that defines a portion of said high compression space.

2. The homogeneous charge compression ignition engine of claim 1 wherein said control piston includes an ignition surface that defines said portion of said high compression space and a control surface oriented in opposition to said ignition surface; and said volume control mechanism includes a control valve operably coupled to said control surface.

3. A homogeneous charge compression ignition engine comprising:

an engine housing defining at least one cylinder;

a power piston having a raised portion and a lowered portion and being positioned to reciprocate in said cylinder between a bottom dead center position and a top dead center position;

a fuel injector in fluid communication with said cylinder and being operable to inject fuel into said cylinder when said power piston is closer to said bottom dead center position than to said top dead center position;

said power piston and said engine housing defining at least part of a high compression space and at least part of a low compression space when said power piston is at said top dead center position; and said low compression space is separated from said high compression space by a movable seal disk attached to said power piston.

4. A method of igniting a homogeneous charge in an engine comprising the steps of:

injecting fuel into a cylinder when a power piston is closer to a bottom dead center position than a top dead center position;

dividing a homogeneous charge between a high compression space and a low compression space;

igniting a portion of said homogeneous charge in said high compression space at least in part by compressing said portion to a compression ignition point;

igniting a remaining portion of said homogeneous charge at least in part by fluidly connecting said high compression space to said low compression space; and adjusting a minimum volume of said high compression space.

5. The method of claim 4 wherein said adjusting step includes a step of repositioning a control piston that defines a portion of said high compression space.

6. A homogeneous charge compression ignition engine comprising:

an engine housing defining at least one cylinder having a centerline;

a power piston being positioned to reciprocate in said cylinder between a bottom dead center position and a top dead center position;

a fuel injector in fluid communication with said cylinder and being operable to inject fuel into said cylinder when said power piston is closer to said bottom dead center position than to said top dead center position;

said power piston and said engine housing defining at least part of a high compression space and at least part of a low compression space when said power piston is at said top dead center position, wherein said centerline intersects said high compression space;

said low compression space has a volume substantially larger than said high compression space;

a volume control mechanism operably coupled to said high compression space; and said volume control mechanism includes a movable control piston that defines a portion of said high compression space.

7. The homogeneous charge compression ignition engine of claim 6 wherein said power piston includes a stepped top that includes said raised portion.

* * * * *